(12) United States Patent
Premathilake et al.

(10) Patent No.: US 8,133,385 B2
(45) Date of Patent: Mar. 13, 2012

(54) GREY WATER TREATMENT SYSTEM

(75) Inventors: Kumudika Premathilake, Schaumburg, IL (US); Gene Wayman, Fox River Grove, IL (US); Sharyn Schnabel, Oakwood Hills, IL (US); Kerry Quinn, Palatine, IL (US)

(73) Assignee: Culligan International Company, Rosemont, IL (US)

( * ) Notice: Subject to any disclaimer, the term of this patent is extended or adjusted under 35 U.S.C. 154(b) by 406 days.

(21) Appl. No.: 12/367,330

(22) Filed: Feb. 6, 2009

(65) Prior Publication Data

US 2010/0200484 A1 Aug. 12, 2010

(51) Int. Cl.
*B01D 36/02* (2006.01)

(52) U.S. Cl. .......... 210/85; 210/181; 210/182; 210/190; 210/192; 210/202; 210/203; 210/205; 210/257.1; 210/258; 210/259; 210/269

(58) Field of Classification Search ................. 210/181, 210/190, 191, 202, 205, 207, 85, 182, 192, 210/203, 257.1, 258, 259, 269, 702, 716
See application file for complete search history.

(56) References Cited

U.S. PATENT DOCUMENTS

| | | | |
|---|---|---|---|
| 3,288,292 A * | 11/1966 | Stone | 210/97 |
| 3,627,133 A * | 12/1971 | Rak | 210/98 |
| 3,716,484 A | 2/1973 | Lincoln et al. | |
| 3,965,001 A | 6/1976 | Irani et al. | |
| 4,104,164 A * | 8/1978 | Chelton | 210/136 |
| 4,156,648 A | 5/1979 | Kuepper | |
| 4,382,368 A * | 5/1983 | Dittell | 62/238.6 |
| 4,402,850 A | 9/1983 | Schorghuber | |
| 5,232,953 A * | 8/1993 | Johnson | 521/26 |
| 5,364,509 A | 11/1994 | Dietrich | |
| 5,699,272 A | 12/1997 | Zabinski | |
| 5,751,598 A | 5/1998 | Zabinski et al. | |
| 5,807,487 A | 9/1998 | Lahti | |
| 5,938,918 A * | 8/1999 | Kidd | 210/104 |
| 6,607,671 B2 | 8/2003 | Vuong | |
| 6,790,362 B2 | 9/2004 | FitzGerald et al. | |
| 6,904,926 B2 | 6/2005 | Aylward et al. | |
| 7,121,292 B2 | 10/2006 | Aylward et al. | |
| 7,132,052 B2 | 11/2006 | Rawson et al. | |
| 2005/0000902 A1 | 1/2005 | Newenhizen et al. | |
| 2007/0119758 A1 | 5/2007 | Duplessis et al. | |
| 2008/0099405 A1 | 5/2008 | Polak et al. | |

FOREIGN PATENT DOCUMENTS

WO WO 2004/041732 A1 5/2004

* cited by examiner

*Primary Examiner* — Matthew Savage
(74) *Attorney, Agent, or Firm* — Greer, Burns & Crain, Ltd.

(57) ABSTRACT

A grey water treatment system for use in conjunction with a water softener, including a grey water holding tank including a first inlet configured to receive grey water and a second inlet configured to receive spent brine from the water softener. The spent brine is mixed with the grey water in the holding tank to flocculate suspended solids in the grey water for subsequent removal.

16 Claims, 2 Drawing Sheets

GREY WATER TREATMENT SYSTEM

BACKGROUND

The present invention relates generally to fluid treatment systems such as water treatment systems including water softeners, and more particularly to a grey water treatment system designed for use with a water softener.

Grey water refers to wastewater generated from residential or commercial sanitation equipment and includes used dishwashing water, laundry water and bath water. Toilet water is not part of grey water and instead is categorized as "black water." Black water is wastewater that has high levels of contaminants and/or particulates and requires significant water treatment. Fresh water or "white water" is potable water that is typically used for drinking, cooking and irrigation. About 50-80% of residential wastewater is grey water.

Fresh water is quickly becoming a scarce resource. Several areas around the world have limited fresh water supplies due to expanding populations, drought and pollution. As a result, it is becoming very difficult and expensive to obtain fresh water in many parts of the world.

Moreover, in the eastern and mid-western regions of the United States there is significant concern over aging municipal water treatment infrastructure. Individual household and satellite grey water treatment systems can reduce the pressure on demand from these aging infrastructures and also provide cost savings to municipalities and the end user. Further, transportation and treatment costs could be significantly reduced if the treatment and reduction of wastewater is performed at the point of use (residential or commercial site) instead of at a satellite site. Hence, the significant cost savings associated with onsite wastewater treatment benefits municipal water treatment facilities.

According to an AWWA 1999 research study, 58% of the total household water is used outdoors, such as for irrigation and recreational use (i.e., swimming pools) and 42% is used indoors. Daily indoor water usage is approximately 69.3 gallons per person per day and 26.7% of that daily usage results from toilet flushing. Hence, a grey water treatment system will allow a consumer to save approximately 26.7% of indoor water use. Furthermore, recycling shower water for use in toilets will reduce the amount of wastewater that is treated at municipal water treatment plants.

Currently, there are very few grey water treatment systems in households and commercial buildings. The existing systems are very basic and do not meet the Environmental Protection Agency's turbidity and biochemical oxygen demand (BOD) standards. Most of these systems also require existing plumbing systems to be re-configured or retrofitted, which is cost prohibitive. Existing systems are also not automated and therefore require significant control and involvement by a user.

SUMMARY

The present grey water treatment system processes grey water to be re-used as non-potable water, such as for irrigation and toilet water. Re-using grey water helps to conserve fresh water, which is typically used as both potable and non-potable water in commercial and residential buildings. By combining a grey water treatment function with a water softener, spent brine is used to flocculate the suspended solids from the grey water. Thus, wastewater volume is reduced in that two conventional waste products, spent brine and grey water are combined and reused.

Specifically, the present grey water treatment system for use in conjunction with a water softener includes a grey water holding tank including a first inlet configured to receive grey water and a second inlet configured to receive spent brine from the water softener. The spent brine is mixed with the grey water in the holding tank to flocculate suspended solids in the grey water for subsequent removal.

Another embodiment of the present grey water treatment system for use in conjunction with a water softener includes a grey water holding tank including a first inlet configured to receive grey water and a second inlet configured to receive spent brine from the water softener. The spent brine is mixed with the grey water to flocculate suspended solids in the grey water. The grey water treatment system includes at least one filter connected to the holding tank, where the at least one filter is configured to remove the flocculated solids from the grey water stored in the holding tank. A disinfector is connected to the at least one filter and is configured to disinfect the grey water.

A further embodiment of the present grey water treatment system for use in conjunction with a water softener includes a grey water holding tank including a first inlet configured to receive grey water and a second inlet configured to receive spent brine from the water softener. The spent brine is mixed with the grey water to flocculate suspended solids in the grey water. A first filter is connected to the holding tank and is configured to remove flocculated solids from the grey water. A second filter is connected to the first filter and is configured to remove dissolved solids remaining in the grey water. A third filter is connected to the second filter and is configured to perform nano-filtration of the grey water. A disinfector is connected to the third filter and is configured to disinfect the grey water.

DETAILED DESCRIPTION

Figure 1:
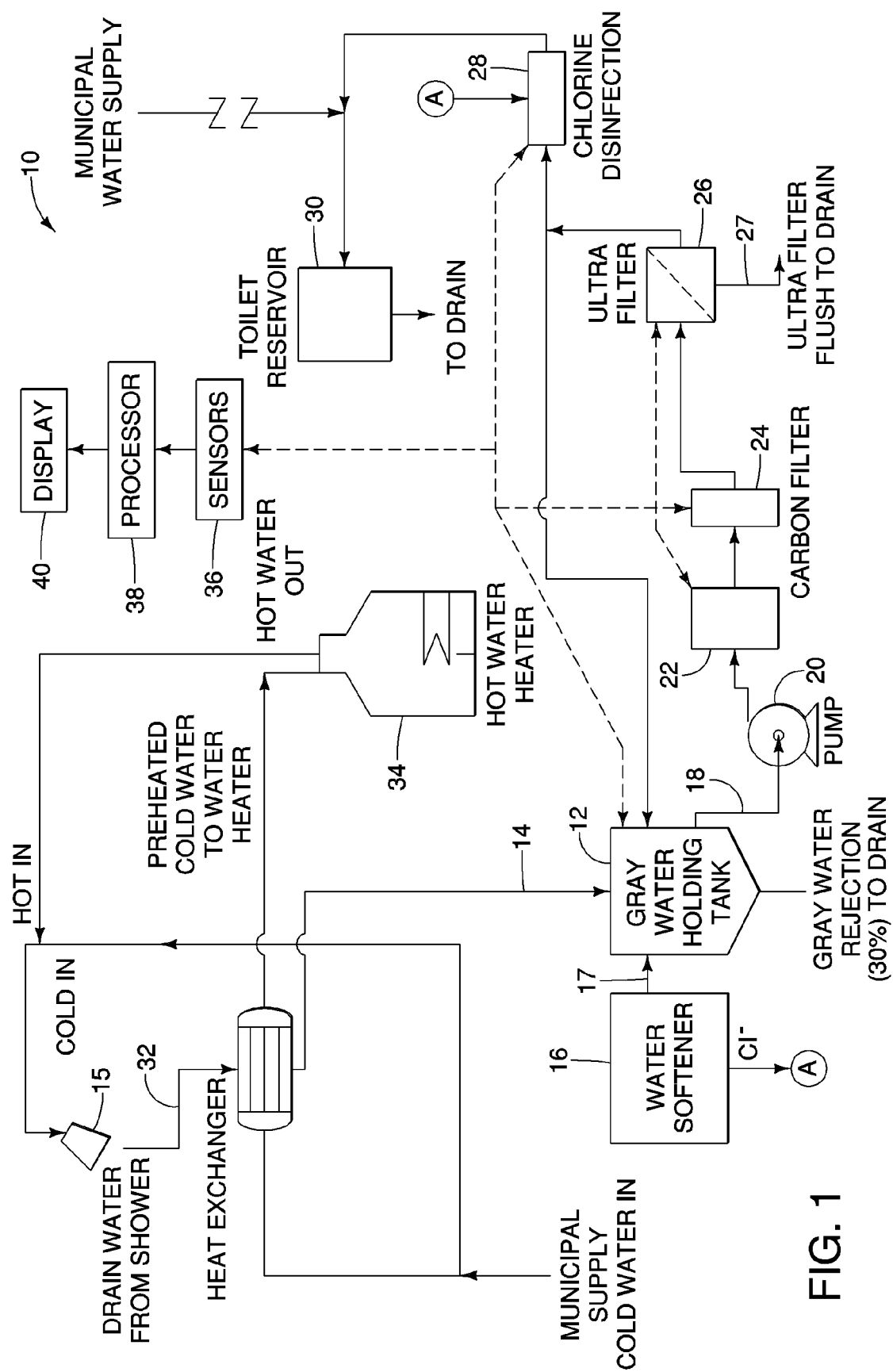
FIG. 1 is a schematic diagram of an embodiment of the present grey water treatment system.

Referring to FIG. 1, the present grey water treatment system generally designated as 10 is configured to process grey water or wastewater from shower drains, sink drains, clothes washers (no rinse cycle water) and rain water to produce an effluent that is suitable for use in irrigation, toilets and other non-potable water devices. In general, the grey water treatment system 10 includes a holding tank for storing collected grey water and a series of filters that are connected to the holding tank. After the filters remove dissolved solids from the grey water, the filtered grey water is disinfected and transported to an irrigation system, household toilet or other suitable water system.

More specifically, the present grey water treatment system 10 includes a grey water holding tank 12 that is sized to store the grey water collected from shower drains, washing machines and rain water drains and other known sources. The size of the holding tank 12 depends on the daily amount of grey water generated by a residential or commercial building. It is contemplated that the holding tank 12 is sized to hold an amount of grey water that is generated each day, each week or during any other suitable time period depending on the application. An inlet or inlet pipe 14 is connected to the holding tank 12 and transfers the grey water collected from the shower, sink, washing machine and rain water drains, collectively indicated as shower drain 15, to the holding tank where it can be stored for up to twenty-four hours. An automated flushing cycle is activated in the holding tank 12 every twenty-four hours to prevent the grey water from remaining in the tank for extended periods of time which would otherwise change the constituent levels of the grey water.

In particular, the biochemical oxygen demand (BOD) of the grey water is an important property. Grey water BOD occurs at a relatively large reaction rate which indicates the presence of organic compounds or materials that are readily available for digestion by micro-organisms. The twenty-four hour automated flushing cycle described above reduces the holding period and the corresponding potential for biological growth in the stored grey water.

The water stored in the grey water holding tank 12 mainly consists of suspended and dissolved solids that have a high turbidity, BOD/chemical oxygen demand levels and micro-organisms. Therefore, the untreated stored grey water is mixed with spent brine received from a water softener 16 such as a residential or commercial water softener via a brine inlet pipe 17. Such treatment systems are well known in the art, and typically include a main treatment tank filled with an ionic exchange resin and a separate brine tank. The brine tank periodically provides brine to the treatment tank for regenerating the exchange resin. In the regeneration process, sodium ions in the brine are exchanged for calcium and magnesium ions trapped on the beads of resin. The spent brine is thus accompanied by the removed calcium and magnesium ions. Examples of such a system are disclosed in U.S. Pat. Nos. 5,699,272; 5,751,598 and 6,790,362 and incorporated herein by reference.

The spent or sour brine is recovered from the brine/slow rinse cycle of the water softener 16. Recycling or using the spent or sour brine (which is otherwise sent to a drain) helps to decrease the cost of operating the present grey water treatment system and also decreases the costs associated with the disposal of the spent brine. This is a significant advantage over existing grey water treatment systems which are relatively expensive to operate due to the amounts of flocculants that must be added to the grey water.

During the initial part of the brine/slow rinse cycle of the water softener 16, the total hardness (amount of Ca and Mg ions) in the waste stream increases and peaks at about 45,390 ppm (as $CaCO_3$) at twenty-four minutes into the brine/slow rinse cycle. The Ca and Mg hardness in the waste stream is over 40,000 ppm (as $CaCO_3$) from twenty-two minutes to thirty-six minutes into the brine/slow rinse cycle.

In a typical water softening system with a brine rinse flow rate of 0.45 gallons per minutes in a slow rinse flow rate of 0.3 gallons per minute, a fourteen minute waste collection period represents approximately five gallons of 40,000 ppm hardness (as $CaCO_3$) waste solution. This spent or sour brine is used to treat approximately 200-250 gallons of the grey water (at approximately 1,000 ppm CaCl solution) in the holding tank 12. It has been found that the spent brine flocculates the suspended solids in the grey water so that solids can be removed as further described below. It should be appreciated that besides spent brine, other suitable flocculating agents can be transferred and utilized by the holding tank 12 to flocculate the suspended solids in the grey water, but the costs associated with such a process would be greater.

After the flocculation process using the spent brine solution is complete, the grey water including the aggregated "floc" is transported via an outlet pipe 18 using a pump 20 to a first filter 22. The size and type of the pump 20 is determined as is known in the art based on the size of the water treatment system 10. In the preferred embodiment, the first filter 22 is a gravity filter including a sand or carbon based media. Other suitable media may also be used in the gravity filter 22 to remove the aggregated floc as is known in the art. The floc collected in the first filter 22 is removed by employing a back-washing step and sent to a drain at predetermined intervals. From the filter 22, the grey water effluent is preferably transported to a second filter 24.

Figure 2:
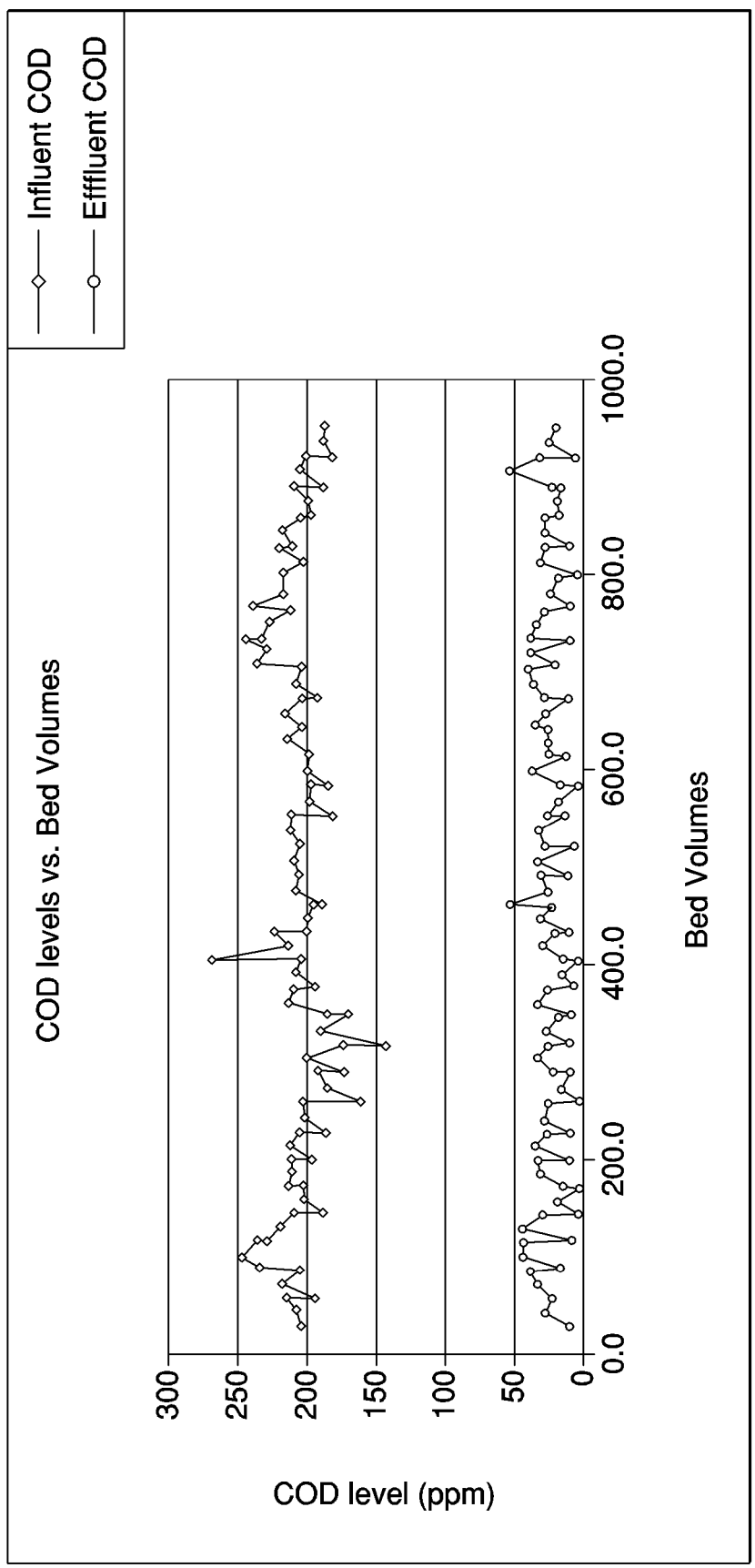
FIG. 2 is a graph showing a comparison between chemical oxygen demand levels and bed volumes for the influent and the effluent.

The second filter 24 includes a carbon filter or other similar filter including a carbon-based media that removes any remaining dissolved solids in the grey water. FIG. 2 graphically indicates the chemical oxygen demand (COD) levels before and after the flocculation/gravity filtration absorption process. The COD levels indirectly indicate the amount of organic compounds, such as organic pollutants, in the grey water. As shown in FIG. 2, the COD levels of the influent grey water measured at the inlet 14 are significantly reduced by the present grey water treatment system 10. For example, the average COD level of the influent grey water is about 200 ppm and the average COD level of the effluent grey water is about 25-30 ppm. The present grey water treatment system 10 is therefore very effective in reducing the organic pollutants in the collected grey water.

After the grey water passes through the second filter 24, it is preferably pumped to a third, final polishing filter 26, which performs nano- or ultra-filtration of the grey water to remove remaining fine dissolved solids from the grey water. The filter media in the third filter 26 may be any suitable nano- or ultra-filtration media.

Any collected residuals or remnants from the third filter 26 are flushed to drain at 27. Subsequently, the grey water is preferably pumped to a disinfector 28 that disinfects the grey water to meet Environmental Protection Agency (EPA) standards for re-used water. In the preferred embodiment, the disinfector 28 utilizes chlorine recovered from the water softener 16 to disinfect the grey water. As is known in the art, the chlorine is a by-product of the brine rinse step in the regeneration cycle of the water treatment process. In the present grey water treatment system, at least 2 ppm of chlorine is added to the grey water to satisfy EPA grey water standards. The recovered chlorine saves significant costs over having to purchase the chlorine or other disinfectant separately and add it to the grey water. However, it is contemplated that other suitable known disinfectants, such as chemicals and ultraviolet light may be used by the disinfector 28 but at increased costs.

Returning now to FIG. 1, after the grey water is disinfected, it can be re-used in a residential or commercial irrigation system, toilet reservoir or other suitable commercial or residential non-potable water device or system, collectively designated 30. If there is not a demand for the grey water (i.e., needed for filling a flushed toilet or for irrigation) then the grey water is returned to the grey water holding tank 12.

In another embodiment, the present grey water treatment system 10 includes a heat exchanger 32 to remove heat from the grey water collected from the shower drains, washing machine or other sources. Employing the heat exchanger 32 helps to conserve energy by removing the heat from the grey water and re-using it to supplement the heat generated by a residential or commercial hot water heater 34. This system saves significant costs associated with heating water in a residential or commercial building. After the heat is removed from the grey water, the grey water is transferred to the grey water holding tank 12 as described above.

In a further embodiment, one or more monitoring sensors 36 are employed by the grey water treatment system 10 to sense the grey water levels in the holding tank 12, the flow rate of the grey water at different points in the grey water treatment system, and the influent and effluent water quality monitoring and reporting devices. It should be appreciated that the sensors 36 may be directly connected to a specific device and/or pipe in the grey water treatment system 10 or be a wireless device that wirelessly communicates with the device, pipe or other suitable component.

In an embodiment, a processor 38 and a display 40 such as a display screen or monitor, are connected to the sensors 36 to display different parameters and/or characteristics of the grey water to a user during the grey water treatment system 10.

While a particular embodiment of the present grey water treatment system has been described herein, it will be appreciated by those skilled in the art that changes and modifications may be made thereto without departing from the invention in its broader aspects.

What is claimed is:

1. A grey water treatment system comprising:
    a grey water source;
    a water softener;
    a source of spent brine produced by said water softener; and
    a grey water holding tank including a first inlet connected to said grey water source and configured to receive grey water from said grey water source, and a second inlet connected to said water softener and configured to receive spent brine from the source of spent brine produced by said water softener, wherein the spent brine is mixed with the grey water to flocculate suspended solids in the grey water for subsequent removal.

2. The grey water treatment system of claim 1, further comprising at least one filter connected to said holding tank, said at least one filter configured to remove the flocculated solids from the grey water stored in said holding tank.

3. The grey water treatment system of claim 2, wherein said at least one filter includes one of a sand-based filter medium and a carbon-based filter medium.

4. The grey water treatment system of claim 1, further comprising a disinfector connected to said holding tank and configured to disinfect the grey water.

5. The grey water treatment system of claim 1, further comprising at least one monitoring sensor connected to at least one of said holding tank, a disinfector, and at least one filter for monitoring at least one parameter of the grey water.

6. The grey water treatment system of claim 1, further comprising a heat exchanger connected to said first inlet of said grey water holding tank for removing heat from the grey water prior to being stored in said holding tank.

7. The grey water treatment system of claim 1, wherein said system reduces COD of influent grey water by an approximate order of magnitude of 10.

8. The grey water treatment system of claim 1, further comprising at least one monitoring sensor connected to at least one of said first inlet and said second inlet connected to said holding tank, said at least one monitoring sensor configured to measure at least one parameter of the grey water.

9. The grey water treatment system of claim 1, further comprising at least one pump connected to an outlet of said holding tank for removing the grey water from said holding tank.

10. A grey water treatment system for use in conjunction with a water softener, comprising:
    a grey water source;
    a water softener;
    a source of spent brine produced by said water softener;
    a grey water holding tank including a first inlet connected to said grey water source and configured to receive grey water and a second inlet connected to said water softener and configured to receive spent brine from the said source of spent brine produced by said water softener, wherein the spent brine is mixed with the grey water to flocculate suspended solids in the grey water;
    at least one filter connected to said holding tank, said at least one filter configured to remove the flocculated solids from the grey water stored in said holding tank; and
    a disinfector connected to said at least one filter and configured to disinfect the grey water.

11. The grey water treatment system of claim 10, wherein said disinfector is configured to receive chlorine from a brine rinse step of a regeneration cycle of the water softener.

12. The grey water treatment system of claim 10, further comprising a heat exchanger connected to said first inlet of said grey water holding tank.

13. The grey water treatment system of claim 12, further comprising a hot water heater connected to said heat exchanger.

14. The grey water treatment system of claim 10, wherein said at least one filter includes one of a sand-based filter medium and a carbon-based filter medium.

15. A grey water treatment system for use in conjunction with a water softener, comprising:
    a grey water source;
    a water softener;
    a source of grey water produced by said water softener;
    a grey water holding tank including a first inlet connected to said grey water source and configured to receive grey water and a second inlet connected to said water softener and configured to receive spent brine from said source of grey water produced by said water softener, wherein the spent brine is mixed with the grey water to flocculate suspended solids in the grey water;
    a first filter connected to said holding tank configured to remove flocculated solids from the grey water;
    a second filter connected to said first filter and configured to remove dissolved solids remaining in the grey water;
    a third filter connected to said second filter and configured to perform nano-filtration of the grey water; and
    a disinfector connected to said third filter and configured to disinfect the grey water.

16. The grey water treatment system of claim 15, wherein said at least one of said first, second and third filters includes a nano-filtration filter.

* * * * *